US006073919A

United States Patent [19]

Hammit et al.

[11] Patent Number: 6,073,919

[45] Date of Patent: Jun. 13, 2000

[54] STAND FOR CHAIN VISE

[76] Inventors: Floyd E. Hammit, 624 S. Pekin Rd., Woodland, Wash. 98674; Stephen E. Anderson, P.O. Box 355, 200 Larson Rd., Mossyrock, Wash. 98564; James R. McCollom, P.O. Box 205, Longview, Wash. 98632

[21] Appl. No.: 09/322,485

[22] Filed: May 28, 1999

[51] Int. Cl.[7] ........ B23Q 3/00

[52] U.S. Cl. ........ 269/17; 269/132

[58] Field of Search ........ 269/17, 130, 131, 269/132, 902, 71; 254/3 R, 3 B

[56] References Cited

U.S. PATENT DOCUMENTS

| | | | |
|---|---|---|---|
| 2,827,690 | 3/1958 | Brown | 269/17 |
| 3,888,049 | 6/1975 | MacSween | 269/132 |
| 4,180,252 | 12/1979 | Cushenberry | 269/17 |
| 4,523,972 | 6/1985 | Cushman et al. | 269/17 |
| 5,135,208 | 8/1992 | Diskin | 269/130 |

*Primary Examiner*—David A. Scherbel

*Assistant Examiner*—Daniel G. Shanley

*Attorney, Agent, or Firm*—John Smith-Hill; Smith-Hill and Bedell

[57] ABSTRACT

A support structure for a chain vise has portions for engaging a support surface and includes a mechanism for tilting the chain vise relative to the support surface.

6 Claims, 3 Drawing Sheets

STAND FOR CHAIN VISE

This invention relates to a stand for a chain vise.

A common task in pipe fitting is welding a straight segment of pipe to an L-shaped segment so that the straight segment is axially aligned with one limb of the L-shaped segment.

A conventional chain vise has a base, a V-shaped jaw projecting upward at one end of the base and a V-shaped support projecting upward at the other end of the base so that a length segment of pipe or similar material resting in the jaw and in the support is in a condition of stable equilibrium. A chain is anchored to the base in the vicinity of the jaw and can be wrapped over the pipe. The chain is provided with a tightening mechanism for tightening the chain over the pipe and holding the pipe against the jaw. In this way, the pipe is held securely in the chain vise.

In one application of the chain vise, the pipe segment held in the vise is L-shaped with one limb of the L gripped in the jaw. If the end face of the free limb of the L is perpendicular to the axis of the free limb and the chain vise is positioned so the end face of the free limb is horizontal, the axis of the free limb is vertical and a level can be used to align a straight segment of pipe with the free limb with a high degree of precision prior to welding the two segments together.

There are practical difficulties in using the chain vise to position an L-shaped pipe segment so that the free limb of the pipe segment is vertical. One major difficulty arises because frictional engagement of the chain with the gripped limb of the L as the chain is tightened tends to cause the pipe segment to turn in the jaw. Consequently, if the pipe segment was initially positioned so that the free limb of the L-shaped pipe segment was vertical, it would no longer be vertical after the chain had been tightened and the operator could not rely on a level to align the second pipe segment with the free limb of the L-shaped pipe segment.

It is not generally possible to twist the L-shaped pipe segment back to its former position after the chain has been tightened because the pipe segment is gripped so firmly in the vise. A possible solution, which is not very satisfactory, is to position the L-shaped pipe segment initially so that the free limb is not quite vertical, in which case when the chain is tightened it is possible that the turning of the pipe segment in the jaw will bring the free limb to a vertical orientation.

SUMMARY OF THE INVENTION

In accordance with the invention there is provided apparatus for gripping a workpiece having an axis, comprising a chain vise having a base and also having a support and a jaw for receiving the workpiece, and a support structure to which the chain vise is attached, the support structure having portions for engaging a support surface and including a mechanism for tilting the chain vise relative to the support surface.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
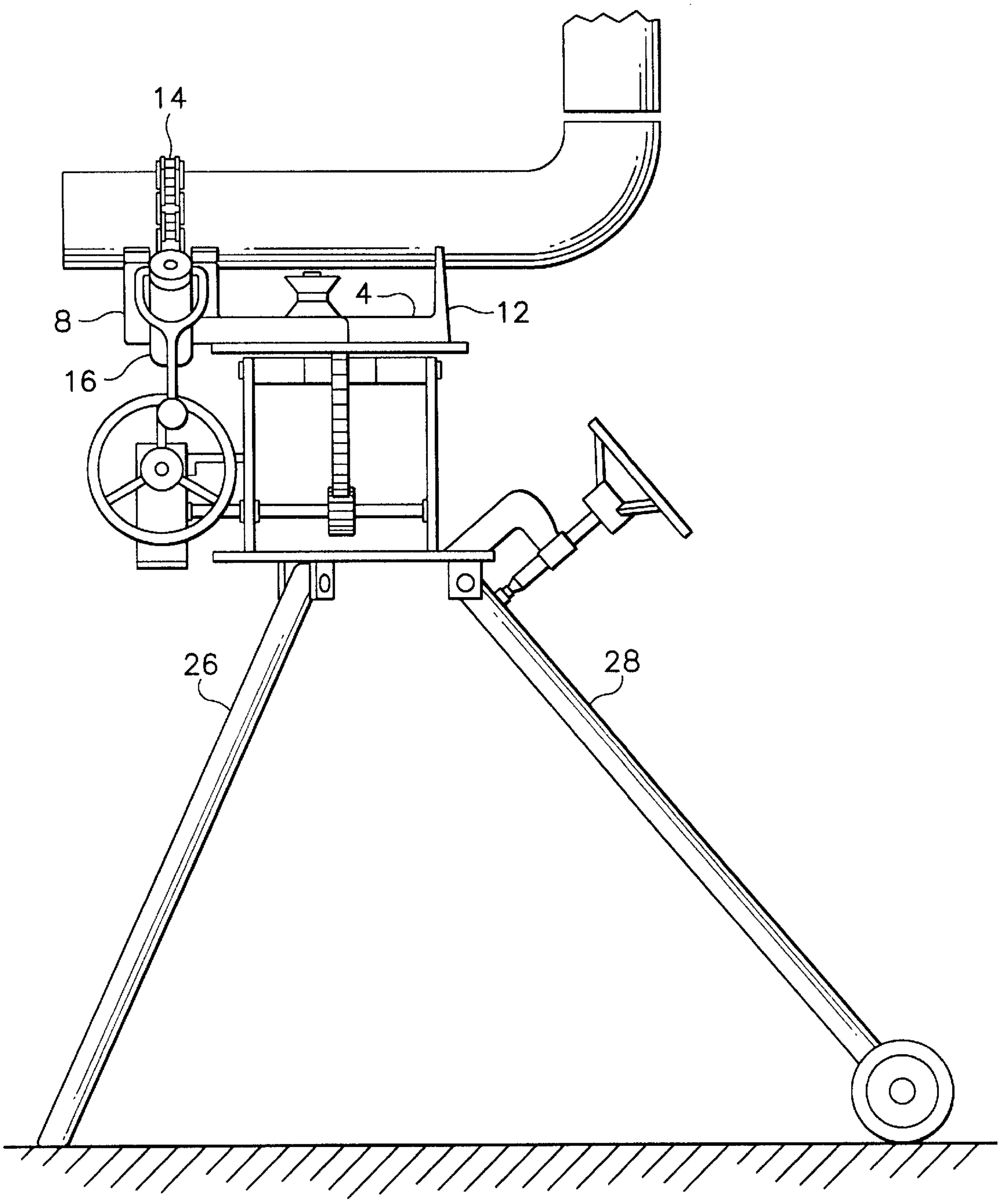
FIG. 1 is a side elevation of a chain vise assembly.

FIG. 1 illustrates a chain vise 2 having a base 4 provided with a jaw 8 and a support 12. The chain vise includes a chain 14 which is attached at one end to a tightening mechanism 16. The chain vise also includes an anchor (not shown) for engaging the chain on the opposite side of the jaw 8 from the tightening mechanism 16. As shown in FIG. 1, a pipe segment can be placed so that one limb rests in the support and in the jaw. The chain is then placed over the pipe and engages the anchor, and the tightening mechanism is used to tighten the chain and hold the pipe segment firmly in the jaw.

Figure 2:
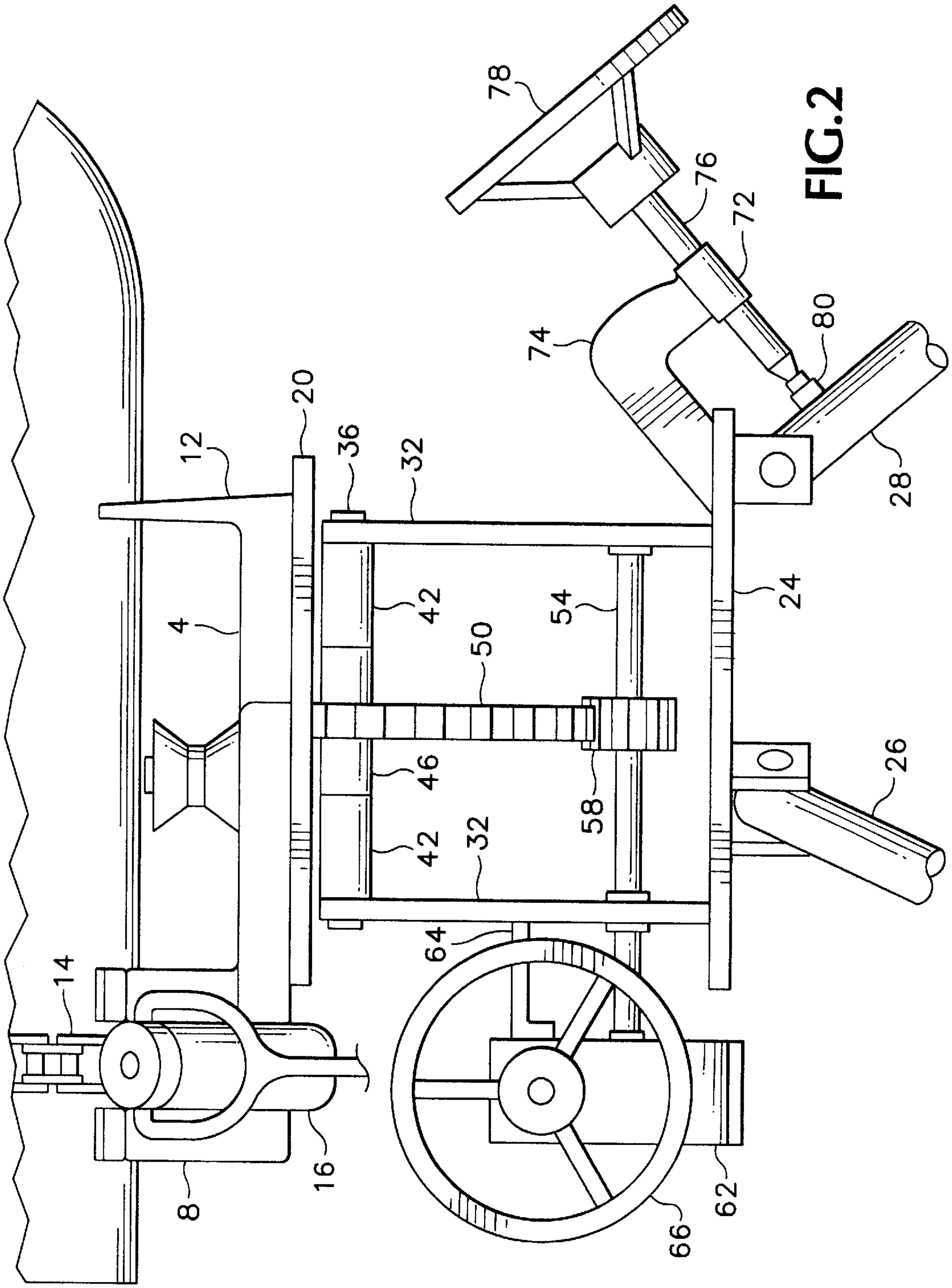
FIG. 2 is an enlarged side elevation view of the chain vise assembly.
Figure 3:
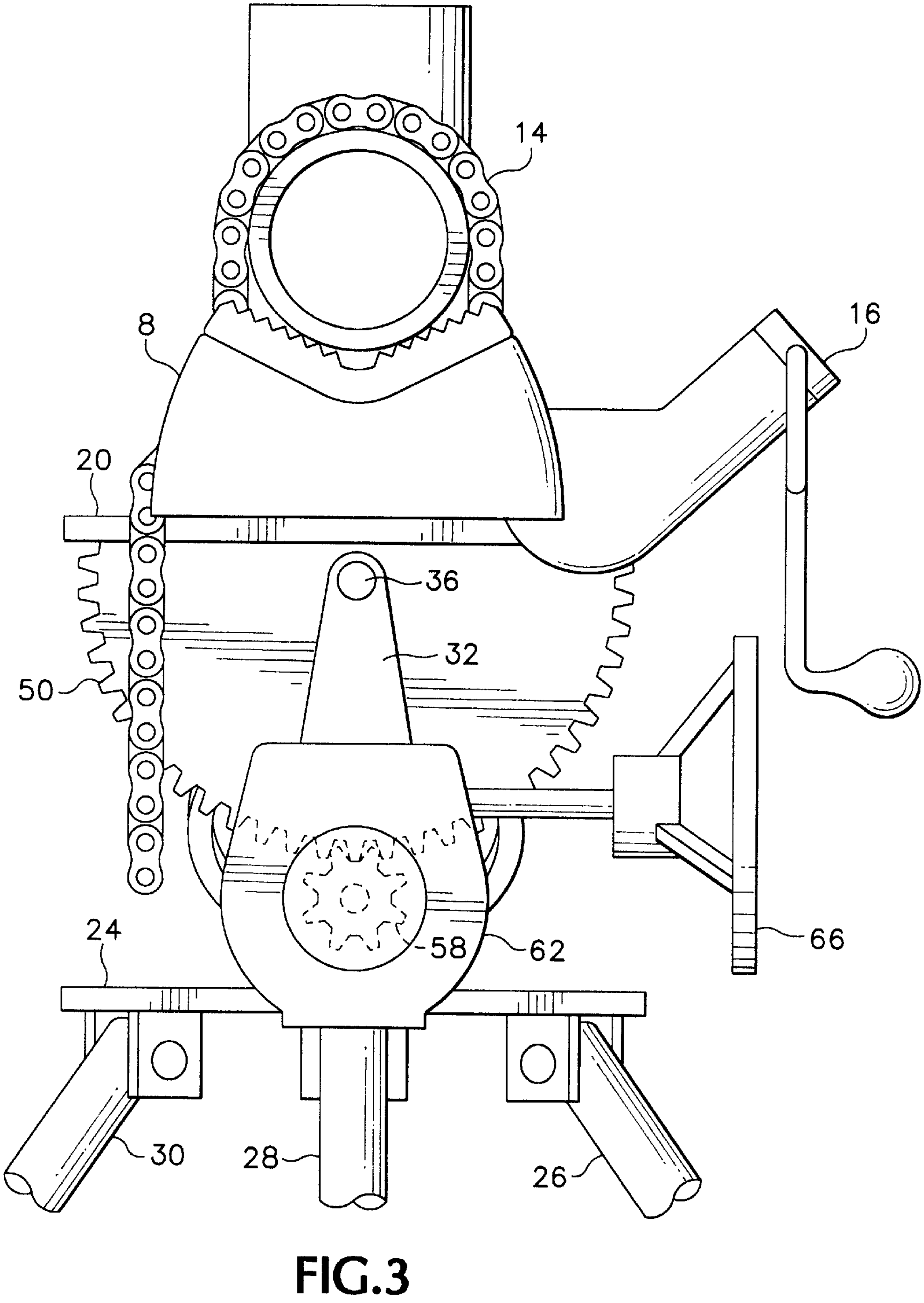
FIG. 3 is an end elevation of the chain vise assembly.

Referring to FIG. 2, the base 4 of the chain vise is attached to a table 20. Beneath the table 20 is a subtable 24 which is supported above the ground on three legs 26, 28, 30. Two stanchions 32 extend upward from the subtable and a shaft 36 is mounted at its two opposite ends in the two stanchions respectively. Three sleeves are fitted on the shaft, the two outer sleeves 42 serving to position the inner sleeve 46 relative to the two stanchions. The inner sleeve 46 is journalled to rotate on the shaft 36 and the axis of rotation of the sleeve 46 on the shaft 36 passes through the center of an arcuate gear segment 50 which is attached to the table 20 and to the sleeve 46.

A reduction gear box 62 is attached to one of the stanchions 32 by a bracket 64 and has an input shaft provided with a hand wheel 66 and an output shaft 54 which is journalled in the stanchions 32 parallel to the shaft 36 and carries a gear 58 which meshes with the gear segment 50. By turning the hand wheel 66, the shaft 54 is turned and, through action of the gear 58 and the gear segment 50, the table 20 can be tilted about the axis of the shaft 36.

The three legs 26, 28 and 30 are pivotally attached to the subtable 24, allowing the legs to be folded parallel to each other for ease of transportation of the chain vise assembly. The legs 26 and 30 are provided with stops (not shown) for limiting pivotal movement away from the parallel orientation. The leg 28 is provided at its lower end with a wheel 70 (FIG. 1). An internally threaded sleeve 72 is attached to the subtable 24 by an arm 74 which positions the sleeve 72 so that its central axis intersects the leg 28. A threaded rod 76 is fitted in the sleeve 72 and is provided at one end with a hand wheel 78 and at its other end with a thrust pad 80 engaging the leg 28. The sleeve 72 and the rod 76 act as a screw jack against the leg 28.

The chain vise assembly shown in the drawings can be used to aid in positioning a straight pipe segment in alignment with one limb of an L-shaped pipe segment.

During set up of the chain vise assembly, the three legs 26, 28, 30 are extended and the stand is positioned so that the three legs rest on the ground. If the ground is not flat, the stand is typically positioned so that a vertical plane containing the leg 28 is approximately parallel to the fall line. One limb of the L-shaped pipe segment is placed in the chain vise and the pipe segment is positioned so that the end face of the free limb is approximately horizontal. The chain 14 is then tightened to secure the pipe segment in position. The end face of the free limb is not necessarily horizontal due to twisting of the pipe segment in the chain vise when the chain was tightened. Prior to placing the L-shaped pipe segment in the chain vise, the end face of the free limb has been machined so that it is perpendicular to the central axis of the free limb. Applying a level to the end face of the free limb, the operator can determine whether the end face of the free limb is horizontal. If the level is not horizontal when it is positioned along a first diameter that is aligned with the gripped limb of the L-shaped pipe segment, the operator can use the hand wheel 78 to adjust the position of the thrust pad 80 relative to the subtable 24 and thereby either push the leg

28 inward, tilting the pipe segment in the counterclockwise direction as seen in FIG. 1, or allow the leg to move outward, tilting the pipe segment in the clockwise direction seen in FIG. 1. In this way, the L-shaped pipe segment can be brought accurately to a position in which the first diameter of the end face of the free limb of the pipe segment is horizontal. The operator then places the level across the end face of the free limb along a second diameter, perpendicular to the first diameter. By using the hand wheel 66 to turn the shaft 54, the table 20 can be tilted about the axis of the shaft 36, which is parallel to the central axis of the gripped limb of the pipe segment, to bring the pipe segment to a position in which the second diameter of the end face is horizontal. In this way, the end face of the free limb is brought to a horizontal orientation. The straight pipe segment can then be positioned over the end of the free limb of the L-shaped pipe segment and can be brought to a vertical orientation with a high degree of precision using a level. The straight pipe segment will then be accurately aligned with the free limb of the L-shaped pipe segment. The straight pipe segment can then be welded to the L-shaped pipe segment.

It will be appreciated that the foregoing description relates to just one application of the chain vise assembly shown in the drawings and that there are other applications in which it is desirable to be able to adjust the orientation of the pipe segment about an axis parallel to the central axis of the limb that is gripped in the chain vise and/or tilt the pipe segment held in the chain vise about an axis perpendicular to the central axis of the limb held in the chain vise.

It will be appreciated that the invention is not restricted to the particular embodiment that has been described, and that variations may be made therein without departing from the scope of the invention as defined in the appended claims and equivalents thereof. For example, other mechanisms than those shown in the drawings can be used to tilt the base of the chain vise about two mutually perpendicular axes.

What is claimed is:

1. Apparatus for gripping a workpiece having an axis, comprising:

a chain vise having a base and also having a support and a jaw for receiving the workpiece, and a support structure to which the chain vise is attached, the support structure having portions for engaging a support surface and including a mechanism for tilting the chain vise relative to the support surface about first and second mutually perpendicular and substantially horizontal tilt axes.

2. Apparatus according to claim 1, wherein the support structure includes a table to which the chain vise is attached and a subtable which is coupled to the table by a mechanism allowing tilting of the table relative to the subtable about the first tilt axis.

3. Apparatus according to claim 2, wherein the subtable is coupled to the table by a mechanism including stanchions attached to the subtable, a shaft extending between the stanchions, and a sleeve which is attached to the table and through which the shaft is fitted, whereby the table can be tilted relative to the subtable about the central axis of the shaft.

4. Apparatus according to claim 3, comprising a gear segment attached to the sleeve, a gear in mesh with the gear segment and a means for driving the gear.

5. Apparatus according to claim 1, wherein the first tilt axis is parallel to the axis of the workpiece.

6. Apparatus according to claim 5, wherein the support structure includes a table structure to which the chain vise is attached, a leg which is pivotally attached to the table structure and an adjustment mechanism effective between the table structure and the leg for adjusting the angular position of the leg relative to the table structure.

* * * * *